US007926464B2

(12) United States Patent
Garman et al.

(10) Patent No.: US 7,926,464 B2
(45) Date of Patent: Apr. 19, 2011

(54) POWER SOURCE BRAKING SYSTEM TO PREVENT ENGINE STALLS

(75) Inventors: Brian Kenneth Garman, Groveland, IL (US); Stephen Michael Wiley, East Peoria, IL (US); Gary Dean Bracht, Chillicothe, IL (US); Chris James Schaub, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 645 days.

(21) Appl. No.: 12/073,084

(22) Filed: Feb. 29, 2008

(65) Prior Publication Data

US 2009/0217907 A1 Sep. 3, 2009

(51) Int. Cl.
*F02D 41/12* (2006.01)
*G01M 17/00* (2006.01)
*F02D 35/02* (2006.01)

(52) U.S. Cl. ........................................................ 123/320

(58) Field of Classification Search .......... 123/320–323, 123/349; 73/114.25; 180/275, 276
See application file for complete search history.

(56) References Cited

U.S. PATENT DOCUMENTS

| | | | | |
|---|---|---|---|---|
| 3,786,792 | A | 1/1974 | Pelizzoni et al. | |
| 4,355,605 | A | 10/1982 | Robinson et al. | |
| 4,805,571 | A | 2/1989 | Humphrey | |
| 5,036,811 | A | 8/1991 | Weiss et al. | |
| 5,146,891 | A | 9/1992 | Nakazawa et al. | |
| 5,257,605 | A | 11/1993 | Pawellek et al. | |
| 5,393,276 | A | 2/1995 | White et al. | |
| 5,409,432 | A | 4/1995 | Steeby | |
| 6,249,733 | B1 | 6/2001 | Smith | |
| 6,330,873 | B1 | 12/2001 | Letang et al. | |
| 6,497,097 | B2 | 12/2002 | Schmidt et al. | |
| 6,705,282 | B2 | 3/2004 | Hlavac | |
| 6,770,008 | B2 | 8/2004 | Shinojima et al. | |
| 7,766,109 | B2 * | 8/2010 | Thompson et al. | 180/65.265 |
| 2004/0204291 | A1 | 10/2004 | Atarashi et al. | |
| 2005/0133006 | A1 | 6/2005 | Frenz et al. | |

FOREIGN PATENT DOCUMENTS

| | | |
|---|---|---|
| KR | 1019970070494 | 11/1997 |
| KR | 1020020094564 | 12/2002 |

* cited by examiner

*Primary Examiner* — Hieu T Vo
(74) *Attorney, Agent, or Firm* — Finnegan, Henderson, Farabow, Garrett & Dunner LLP

(57) ABSTRACT

A system to prevent engine stalls for a machine having a power source is disclosed. The power source is in communication with a controller, which is configured to determine the temperature of the power source and compare the temperature of the power source to a predetermined threshold temperature. The controller is configured to disable power source braking if the temperature of the power source is less than the threshold temperature. The controller is further configured to determine the power source speed and the travel speed of the machine, and disable power source braking if the power source speed and machine travel speed are less than predetermined thresholds.

20 Claims, 5 Drawing Sheets

POWER SOURCE BRAKING SYSTEM TO PREVENT ENGINE STALLS

TECHNICAL FIELD

The present disclosure relates generally to preventing engine stalls and, more particularly, to preventing engine stalls by disabling engine braking under certain conditions.

BACKGROUND

A machine such as, for example, an off-highway truck, may include one or more sources of power. Power sources may include engines, batteries, and any other suitable energy generating or energy storage devices. The machine may also include powered devices that may run using power generated or otherwise supplied by the power source. When operating such a machine, it is useful to prevent stalling of the power source that operates the machine.

For example, during operation of the machine, multiple powered devices may request power from the power sources. At times, power requests may conflict because the power sources may not be capable of fulfilling each and every power request. If power requested by the powered devices exceeds the available power from the power source, some or all of the powered devices may not receive sufficient power, and/or the power source may fail or stall. Power source failures may result in machine downtime and decreased efficiency.

Engine braking may contribute to stalling of such machines. For example, during cold engine operation when the lubricating oil is cold and thick, engine braking tends to stall the engine because engines generally need a richer fuel mixture in order to maintain idle speed while warming up. Also, during slow speeds, and in particular during a panic stop, where the engine speed is decreasing rapidly, turning off engine braking at the traditional engine speeds of between 800-1000 rpm does not give the engine enough time to recover and may result in engine stalling. One approach has been to disable engine braking just prior to the traditional engine speeds. However, this approach prevents an operator from performing slow-speed engine braking, which may be necessary in situations where a machine such as a gravel truck enters a pit mine.

A system to prevent engine stalling is described in U.S. Pat. No. 5,146,891 (the ’891 patent) to Nakazawa et al. The ’891 patent discloses a system and method for controlling an operation of an internal combustion engine of a vehicle having an automatic transmission. The ’891 patent varies at least one of predetermined fuel supply recovery engine revolution speed or predetermined fuel supply cut-off engine revolution speed during engine deceleration and in accordance with a state of operation of the automatic transmission. The ’891 patent detects the engagement of the engine brake controlling clutch and can either delay or quicken the timing of both the fuel supply cut-off and fuel recovery, thereby preventing engine stalls.

Although the system of the ’891 patent may prevent engine stalls, it does not compensate for either cold engine operating mode or slow speed operating mode. For example, engine braking tends to stall engines during cold engine operation and in situations where the engine speed is decreasing rapidly. Thus, the system of the ’891 patent may not sufficiently prevent engine stalls in all engine operating situations.

The disclosed power source braking system is directed to overcoming one or more of the problems set forth above.

SUMMARY

In one aspect, the present disclosure is directed to a machine having a power source and a controller that is in communication with the power source. The controller is configured to determine the temperature of the power source and compare the temperature of the power source to a predetermined threshold temperature. The controller is further configured to disable power source braking if the temperature of the power source is less than the predetermined threshold temperature.

In another aspect, the present disclosure is directed to a method of preventing the stalling of a machine. The method includes determining a temperature of a power source of the machine. The temperature of the power source is compared to a predetermined threshold temperature. Engine braking is disabled if the temperature of the power source is less than the predetermined threshold.

In yet another aspect, the present disclosure is directed to a machine having a power source and a controller in communication with the power source. The controller is configured to determine a power source speed and a machine travel speed and compare the power source speed to a predetermined threshold power source speed. The controller is further configured to compare the machine travel speed to a predetermined threshold machine travel speed and to disable power source braking if the power source speed and the machine travel speed are less than the respective predetermined threshold power source speed and the predetermined threshold machine travel speed.

DETAILED DESCRIPTION

Figure 1:
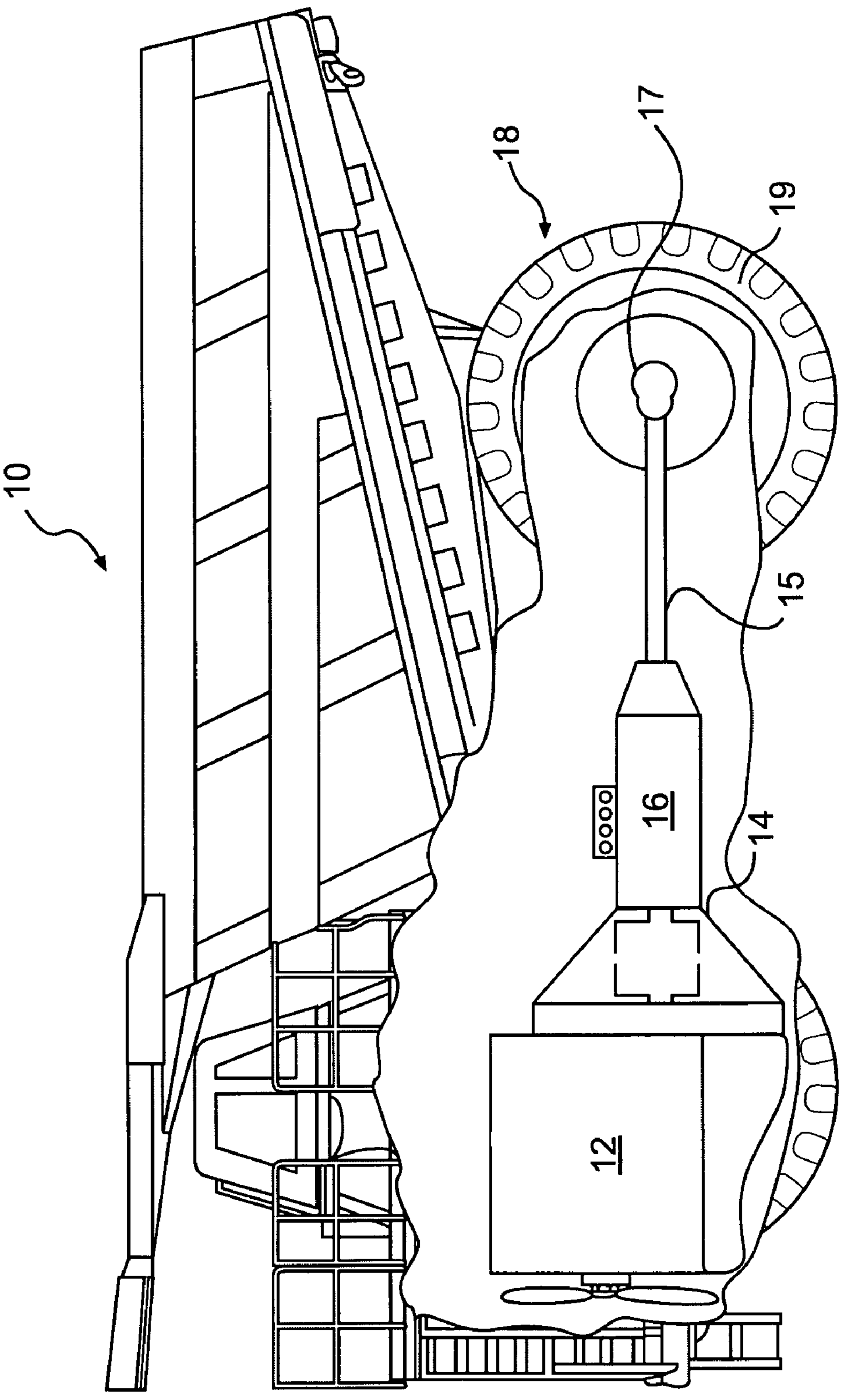
FIG. 1 is a diagrammatic illustration of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth moving machine such as an off-highway truck. Machine 10 may alternatively embody an on-highway truck, a passenger vehicle, or any other suitable operation-performing machine. Machine 10 may include a power source 12, a torque converter 14, and a transmission 16 operably connected to a traction device 18.

Figure 2:
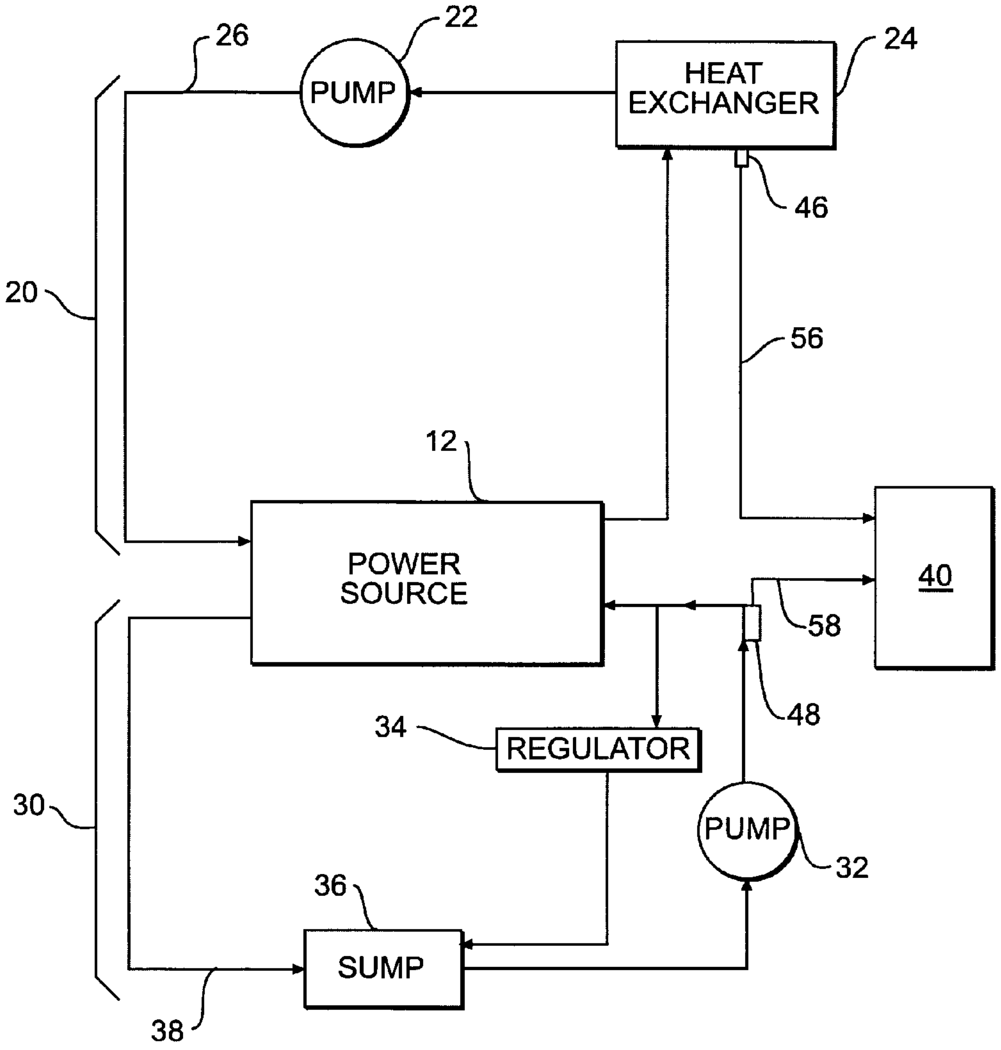
FIG. 2 is a diagrammatic illustration of certain components of the exemplary disclosed machine of FIG. 1.

As shown in FIG. 2, machine 10 may include one or more systems that facilitate the production of power. In particular, machine 10 may include a thermal management system 20 and a lubrication system 30. Fluid flows may be regulated by thermal management system 20 to regulate temperatures of machine 10.

Power source 12 may be configured to produce a power output, and may include an internal combustion engine. For example, power source 12 may include a diesel engine, a gasoline engine, a gaseous fuel-powered engine, as well as hybrid engine systems that run on a combination of fuel and electrical power, or any other engine apparent to one skilled in the art.

Torque converter 14 may embody a hydraulic device configured to couple transmission 16 to power source 12. Torque converter 14 may allow power source 12 to rotate independently of transmission 16. It is contemplated that torque converter 14 may alternatively be embodied in a non-hydraulic device such as, for example, a mechanical diaphragm clutch.

Transmission 16 may include numerous components that interact to transmit power from power source 12 to traction device 18. In particular, transmission 16 may be a multi-speed bidirectional mechanical transmission having a neutral gear ratio, a plurality of forward gear ratios, a reverse gear ratio, and one or more clutches (not shown). The clutches may be selectively actuated to engage predetermined combinations of gears (not shown) that produce a desired output gear ratio. It is contemplated that transmission 16 may be an automatic-type transmission, with shifting based on a power source speed, a maximum selected gear ratio, and a shift map. The output of transmission 16 may be connected to and configured to rotatably drive traction device 18 via a shaft 15 connected to drive assembly 17, thereby propelling machine 10.

Traction device 18 may include wheels 19 located on each side of machine 10 (only one side shown). Alternately, traction device 18 may include tracks, belts, or other driven traction devices. Traction device 18 may be driven by transmission 16 via drive assembly 17 to rotate in accordance with an output rotation of transmission 16.

Thermal management system 20 may include components that facilitate cooling of power source 12. Specifically thermal management system 20 may include a heat exchanger 24 and a pump 22 (coolant pump). Coolant such as water, glycol, a water/glycol mixture, a blended air mixture, or any other heat transferring fluid may be pressurized by pump 22 and directed through a passageway 26 to power source 12 to absorb heat therefrom. After exiting power source 12, the coolant may pass through passageway 26 to heat exchanger 24 to release the absorbed heat, and then be drawn back to pump 22 via passageway 26. Only one passageway 26 is shown but it should be appreciable to an ordinarily skilled artisan that more than one passageway may be used.

Pump 22 may be engine driven to generate the flow of coolant described above. In particular, pump 22 may include an impeller (not shown) disposed within a volute housing having an inlet and an outlet. As the coolant enters the volute housing, blades of the impeller may be rotated by operation of power source 12 to push against the coolant, thereby pressurizing the coolant. An input torque imparted by power source 12 to pump 22 may be related to a pressure of the coolant, while a speed imparted to pump 22 may be related to a flow rate of the coolant. It is contemplated that pump 22 may alternatively embody a piston type pump, if desired, and may have a variable or constant displacement.

Heat exchanger 24 may embody the main radiator (i.e., the high temperature radiator) of power source 12 and be situated to dissipate heat from the coolant after it passes through power source 12. As the main radiator of power source 12, heat exchanger 24 may be an air-to-liquid type exchanger. That is, a flow of air may be directed through channels of heat exchanger 24 such that heat from the coolant in adjacent channels is transferred to the air. In this manner, the coolant passing through power source 12 may be cooled to below a predetermined operating temperature of power source 12.

A cooling fan (not shown) may be associated with heat exchanger 24 to generate the flow of cooling air. In particular, the fan may include an input device (not shown) such as a belt driven pulley, a hydraulically driven motor, or an electrically powered motor that is mounted to power source 12, and fan blades (not shown) fixedly or adjustably connected thereto. The cooling fan may be powered by power source 12 to cause the fan blades to blow or draw air across heat exchanger 24. It is contemplated that the cooling fan may additionally blow or draw air across power source 12 for external cooling thereof, if desired. It should be noted that any thermal management device appreciable to one of ordinary skill in the art may be used.

Lubrication system 30 may contain a pump 32 (lubricating fluid pump), a pressure regulator 34, a reservoir or sump 36, and passageway or pressurized fluid line 38. Lubrication system 30 may provide a source of pressurized fluid to power source 12 through passageway 38, to lubricate reciprocating and rotating components, and to prevent metal-on-metal contact resulting from the motion thereof. Passageway 38 may connect the various components of lubrication system 30 and provide pressurized fluid to lubricate the various components, including lubricating a power source braking device (not shown). Lubrication system 30 may contain other components commonly known in the art, such as, for example, a filter (not shown) configured to remove particles from the lubricating fluid.

Figure 3:
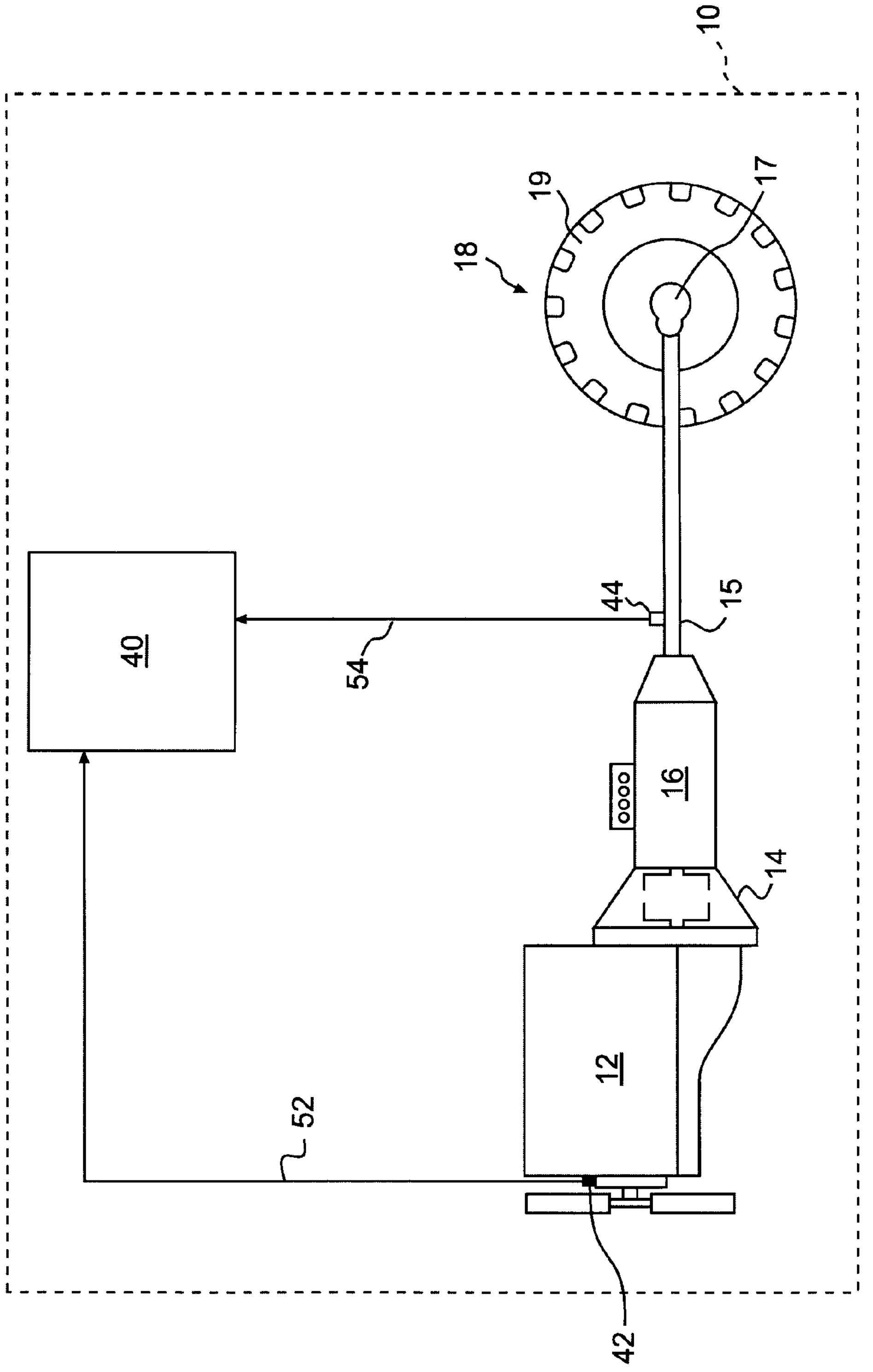
FIG. 3 is a diagrammatic illustration of an exemplary disclosed power source braking system for the machine of FIG. 1.

As shown in FIG. 3, one or more sensors may be associated with power source 12. The sensors may be adapted to provide relevant indications of the operation of power source 12. For example, a power source speed sensor 42 may be adapted to sense power source speed and produce a power source speed signal. Power source speed sensor 42 may be, for example, in the form of a magnetic pick-up sensor adapted to produce a signal corresponding to the rotational speed of the power source 12.

One or more sensors may also be associated with machine 10 to sense a travel speed of machine 10. Machine travel speed sensor 44 may be any speed sensor appreciable to one of ordinary skill in the art, such as a magnetic pick-up sensor.

In addition, as shown in FIG. 2, one or more sensors may also be associated with thermal management system 20 and lubrication system 30. For example, a coolant temperature sensor 46 may be adapted to sense a temperature of the coolant, and an oil temperature sensor 48 may be adapted to sense a temperature of the lubricating oil. Coolant temperature sensor 46 and oil temperature sensor 48 may be any sensor appreciable to one of ordinary skill in the art, such as a resistance temperature detector, thermocouples, or thermistors. Lubricating system 30 may also include an oil viscosity sensor (not shown).

A controller 40 may include, for example, an electronic control module (ECM) or another processor capable of executing, and/or outputting command signals in response to received and/or stored data. Controller 40 may include computer-readable storage, such as read-only memories (ROM), random-access memories (RAM), and/or flash memory; one or more secondary storage device, such as a tape-drive and/or magnetic disk drive; one or more microprocessor (CPU), and/or any other components for running an application and processing data. The microprocessor(s) may comprise any suitable combination of commercially available or specially-constructed microprocessors for controlling system operations. As such, controller 40 may include instructions and/or data stored as hardware, software, and/or firmware within the memory, secondary storage device(s), and/or microprocessor(s). Alternatively or additionally, controller 40 may include and/or be associated with various other suitably arranged hardware and/or software components. For example, controller 40 may include power supply circuitry, signal conditioning circuitry, solenoid driver circuitry, amplifier circuitry, timing circuitry, filtering circuitry, switches, and/or other types of circuitry, if desired.

Controller 40 may include one or more data storage structures in the computer-readable medium containing predetermined data to facilitate operation of machine 10 in connection with an algorithm of machine 10. The data storage structures may include, for example, arrays matrices, tables, variable classes, etc. The predetermined data may be based on known machine control system performance specifications, such as those of power source 12, transmission 16, traction device 18, thermal management system 20, lubrication system 30, power source speed sensor 42, machine travel speed sensor 44, coolant temperature sensor 46, oil temperature sensor 48 and/or other components or systems of machine 10. The predetermined data may be derived from performance test results, engineering knowledge, and/or other resources. For example, the data storage may include an appropriate engine speed at which engine braking should take place.

Controller 40 may be in communication with various components of machine 10. In particular, controller 40 may be in communication with the power source speed sensor 42 via a communication line 52 to receive an indication of a rotational speed of power source 12, with the machine travel speed sensor 44 via a communication line 54 to receive an indication of a travel speed of machine 10, and with coolant temperature sensor 46 via a communication line 56 to determine temperature of the engine. It is contemplated that controller 40 may alternatively be in communication with oil temperature sensor 48 via communication line 58 to determine a temperature of the engine.

Power source speed sensor 42 may be embodied in a magnetic pick-up sensor configured to sense a power source speed and to produce a signal corresponding to the rotational speed of power source 12. Similar to power source speed sensor 42, machine travel speed sensor 44 may also be embodied in a magnetic pick-up sensor, but configured to sense a machine travel speed and to produce a travel speed signal. Machine travel speed sensor 44 may be disposed on shaft 15, on a component of drive assembly 17, or on any other suitable component of machine 10, and configured to produce a signal corresponding to the travel speed of machine 10.

Controller 40 may determine a cold mode power source operation by establishing a maximum threshold power source temperature. For example, controller 40 may set the maximum threshold power source temperature to 70 degrees Celsius. That is, when the temperature of the power source is below 70 degrees Celsius, the power source is operating in cold mode. It should be noted that controller 40 may set the maximum threshold temperature to any temperature appreciable to one of ordinary skill in the art. Controller 40 may determine the temperature of power source 12 via the signal transmitted from the coolant temperature sensor 46 or the oil temperature sensor 48. Alternatively, controller 40 may compute or estimate the temperature of the power source based on computational techniques appreciable to one of ordinary skill in the art.

Controller 40 may also determine a slow power source mode by establishing a maximum threshold travel speed of machine 10 and a maximum threshold speed of power source 12. For example, controller 40 may set the maximum threshold travel speed to 15 miles per hour (mph). That is, if machine 10 is travelling at speeds less than 15 mph, machine 10 is operating in slow speed. In addition, controller 40 may set the maximum threshold power source speed to 1400 revolutions per minute (rpm). In other words, if the power source is rotating at less than 1400 rpm, machine 10 is operating in slow mode. Controller 40 may determine the travel speed of machine 10 via the signal from the machine travel speed sensor 44, and the speed of power source 12 may be determined from the signal transmitted to the controller by the power source speed sensor 42. Alternatively, controller 40 may compute or estimate the speed of the power source and the machine travel speed based on computational techniques appreciable to one of ordinary skill in the art. It should be appreciated that controller 40 may set the maximum threshold travel speed and maximum threshold power source speed to any speed appreciable to an ordinarily skilled artisan.

Figure 4:
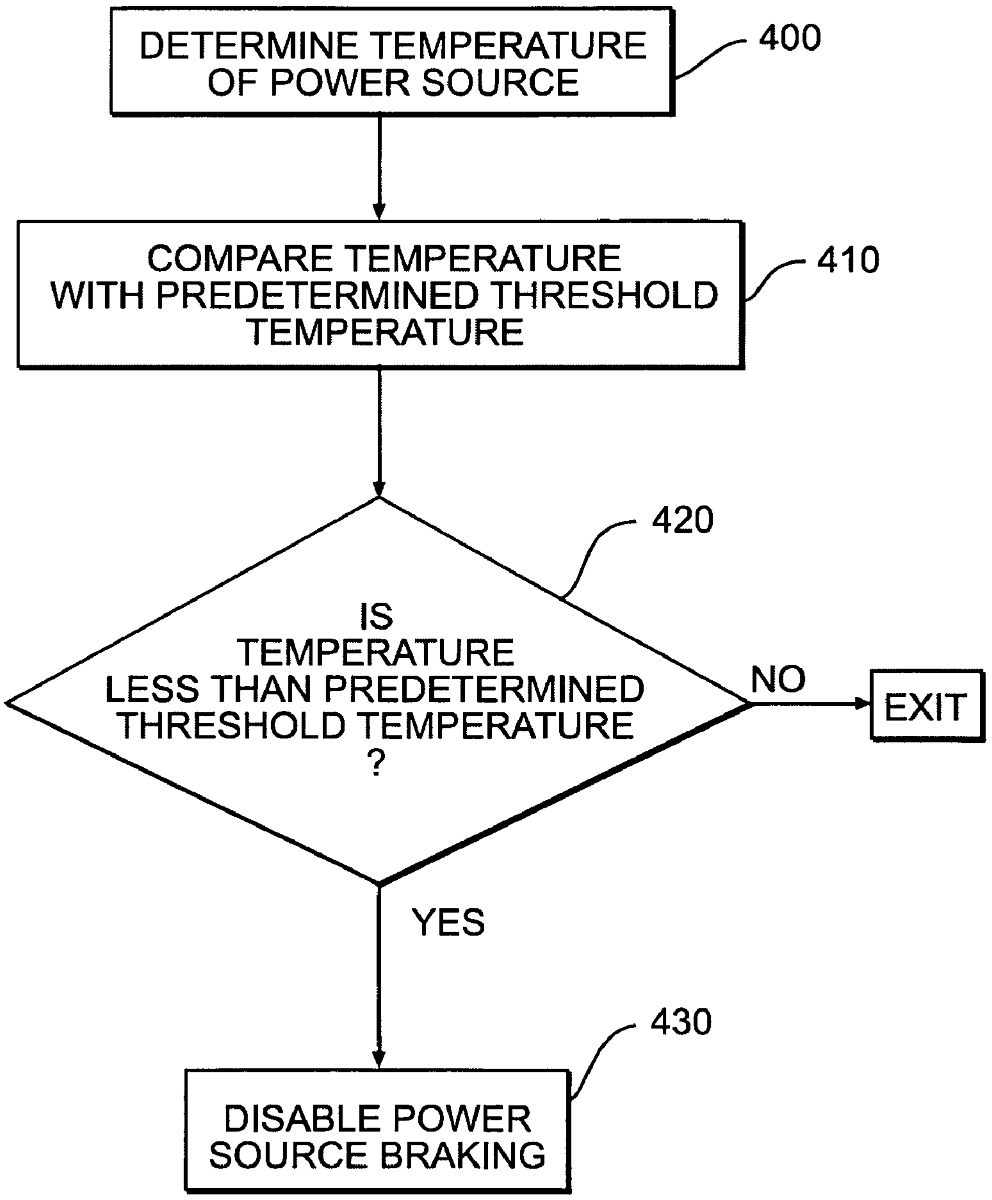
FIG. 4 is a flow chart depicting an exemplary method of operating the power source braking system of FIG. 3.
Figure 5:
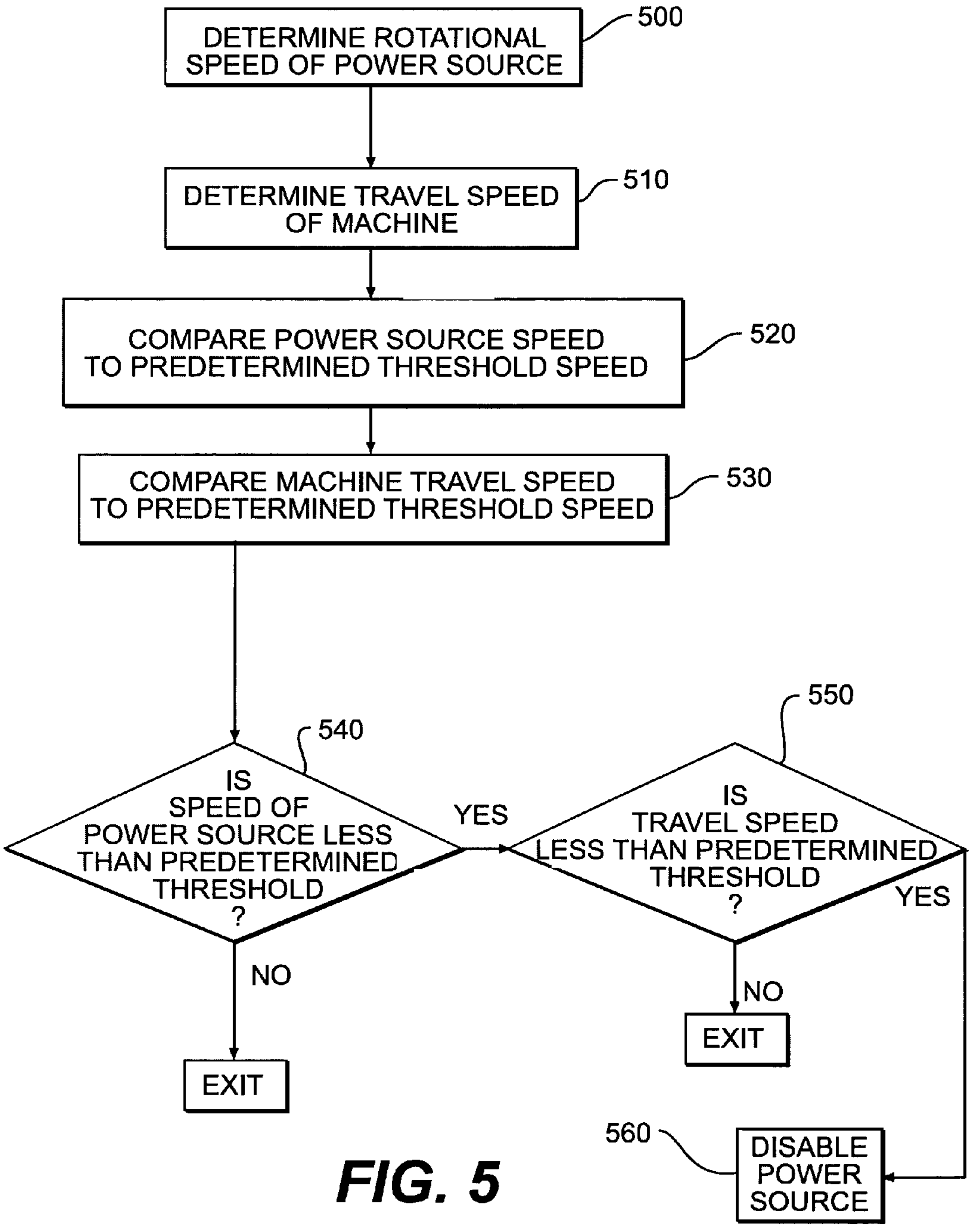
FIG. 5 is a flow chart depicting an alternate exemplary method of operating the power source braking system of FIG. 3.

FIG. 4 illustrates an exemplary operation of the power source braking system, and FIG. 5 illustrates an alternate exemplary operation of the power source braking system. FIGS. 4 and 5 will be described in detail below.

INDUSTRIAL APPLICABILITY

The disclosed power source braking system may be applicable to any machine where stalling of the power source may be undesirable. The disclosed power source braking system may prevent power source stalling during periods of cold mode operation or during periods where the machine is operating in a slow mode. Operation of an exemplary power source braking system will now be explained.

Referring to FIG. 4, controller 40 may determine the current temperature of power source 12 (step 400) by reading the signal transmitted from coolant temperature sensor 46 or oil temperature sensor 48. Controller 40 may compare the temperature of power source 12 with a predetermined threshold temperature (step 410). If the current temperature of power source 12 is determined to be less than the predetermined threshold temperature (step 420), controller 40 may disable braking of power source 12 (step 430). For example, controller 40 may set the predetermined threshold temperature to 70 degrees Celsius, and if the temperature of power source 12 is less than 70 degrees Celsius (cold mode operation), controller 40 may disable power source braking (step 430).

Referring to FIG. 5, controller 40 may determine the current rotational speed of power source 12 (step 500) by reading the signal transmitted from power source speed sensor 42. Controller 40 may also determine the travel speed of machine 10 by reading the signal transmitted by machine travel speed sensor 44 (step 510). Controller 40 may compare the power source speed to a predetermined threshold power source speed (step 520), and compare the machine travel speed to a predetermined threshold machine travel speed (step 530). If the power source speed is determined to be less than the predetermined threshold power source speed (step 540) and machine travel speed is determined to be less than the predetermined threshold machine travel speed (step 550), controller 40 may disable braking of power source 12 (step 560).

For example, controller 40 may set the predetermined threshold power source speed to 1400 rpm, and set the predetermined machine travel speed to 15 mph. If the speed of power source 12 is less than 1400 rpm and the travel speed of machine 10 is less than 15 mph (slow mode operation), controller 40 may disable power source braking.

The disclosed power source braking system disables engine braking when the power source is below a certain temperature, thereby accounting for cold engine operating mode and preventing machine stalling when the lubricating oil is cold and thick. In addition, because controller 40 takes into account both the power source speed and the machine travel speed, the power source braking system can prevent machine stalling while allowing an operator to perform slow-speed engine braking, which may be necessary in situations where a machine such as a gravel truck enters a pit mine.

It will be apparent to those skilled in the art that various modifications and variations can be made to the power source braking system of the present disclosure. Other embodiments of the power source braking system will be apparent to those skilled in the art from consideration of the specification and practice of the power source braking system disclosed herein. It is intended that the specification and examples be considered as exemplary only, with a true scope of the disclosure being indicated by the following claims and their equivalents.

What is claimed is:

1. A machine, comprising:

a power source; and a controller in communication with the power source, the controller configured to:

determine a power source speed and a machine travel speed;

compare the power source speed to a predetermined threshold power source speed;

compare the machine travel speed to a predetermined threshold machine travel speed; and disable power source braking if the power source speed and the machine travel speed are less than the respective predetermined threshold power source speed and the predetermined threshold machine travel speed.

2. The machine of claim 1, further including at least one sensor configured to sense a parameter indicative of the power source speed and transmit the power source speed to the controller.

3. The machine of claim 1, further including at least one sensor configured to sense a parameter indicative of the machine travel speed and transmit the machine travel speed to the controller.

4. The machine of claim 1, wherein the controller is further configured to determined a temperature of the power source and to disable the power source braking if the temperature is less than a predetermined threshold temperature.

5. A machine, comprising:

a power source; and a controller in communication with the power source, the controller configured to:

determine a temperature of the power source and compare the temperature of the power source to a predetermined threshold temperature, and disable power source braking if the temperature of the power source is less than the predetermined threshold temperature.

6. The machine of claim 5, further including at least one sensor configured to sense a parameter indicative of the temperature of the power source and transmit the temperature to the controller.

7. The machine of claim 6, wherein the parameter indicative of the temperature of the power source is an oil temperature.

8. The machine of claim 6, wherein the parameter indicative of the temperature of the power source is a coolant temperature.

9. The machine of claim 5, wherein the controller is further configured to determine a machine travel speed.

10. The machine of claim 9, wherein the controller is configured to disable power source braking when the machine travel speed is less than a predetermined threshold.

11. The machine of claim 9, further including at least one sensor configured to sense a parameter indicative of the machine travel speed and transmit the machine travel speed to the controller.

12. The machine of claim 5, wherein the controller is further configured to determine a power source speed.

13. The machine of claim 12, wherein the controller is configured to disable power source braking when the power source speed is less than a predetermined threshold.

14. The machine of claim 13, further including at least one sensor configured to sense a parameter indicative of the power source speed and transmit the power source speed to the controller.

15. A method of preventing the stalling of a machine, including:

determining a temperature of a power source of the machine;

comparing the temperature to a predetermined threshold temperature; and disabling engine braking if the temperature is less than the predetermined threshold temperature.

16. The method of claim 15, wherein the predetermined threshold temperature is 70 degrees Celsius.

17. The method of claim 15, further including determining a power source speed of the machine and disabling power source braking if the power source speed is less than a predetermined threshold power source speed.

18. The method of claim 17, wherein the predetermined threshold power source speed is 1400 rpm.

19. The method of claim 15, further including determining a machine travel speed and disabling power source braking if the machine travel speed is less than a predetermined threshold machine travel speed.

20. The method of claim 19, wherein the predetermined threshold machine travel speed is 15 mph.

* * * * *